United States Patent [19]

Traber et al.

[11] 3,721,699
[45] March 20, 1973

[54] O,N-DIPHENYL-CARBAMIC ACID ESTERS

[75] Inventors: Walter Traber, Riehen; Heinz Hambock, Binningen; Anton Georg Weiss, Benken, all of Switzerland

[73] Assignee: Ciba-Geigy Corporation, Ardsley, N.Y.

[22] Filed: Jan. 26, 1970

[21] Appl. No.: 5,954

[52] U.S. Cl. ............ 260/471 C, 260/455 A, 424/300
[51] Int. Cl. ............................................ C07c 125/06
[58] Field of Search ................................. 260/471 C

[56] References Cited

UNITED STATES PATENTS 3,371,109    2/1968    Baker et al. ................ 260/471 C

*Primary Examiner*—Henry R. Jiles
*Assistant Examiner*—L. Arnold Thaxton
*Attorney*—Karl F. Jorda and Frederick H. Rabin

[57] ABSTRACT

Certain O,N-diphenyl-carbamic acid esters in which one phenyl moiety is substituted in the 2-position by a halogenated phenoxy radical are disclosed as microbicidally active compounds. A method for controlling microorganisms with the aid of such compounds and compositions containing them are also described.

9 Claims, No Drawings

O,N-DIPHENYL-CARBAMIC ACID ESTERS

The present invention concerns new O,N-diphenyl-carbamic acid esters, process for the production of these compounds as well as compositions and methods for the control of microorganisms employing the new carbamic acid esters.

The new O,N-diphenyl-carbamic acid esters (carbanilic acid-phenyl esters) correspond to the Formula I

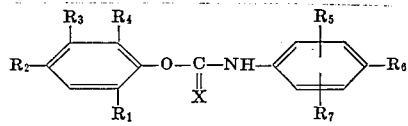

(I)

In this formula:
$R_1$ represents a phenoxy radical substituted by at least one and at most three identical or differing halogen atoms,
of the symbols $R_2$, $R_3$ and $R_4$ at least one represents chlorine or bromine, the others each independently represent hydrogen, chlorine or bromine,
$R_5$ and $R_7$ each independently represent hydrogen, halogen, lower alkyl, lower alkoxy, lower halogenalkyl, nitro or hydroxy,
$R_6$ represents hydrogen, halogen, lower alkyl, lower alkoxy, dialkylamino, hydroxy, and
X represents oxygen or sulfur.

In Formula I, $R_1$ is in particular one of the following halogenated phenoxy radicals: 4-chlorophenoxy, 4-bromophenoxy, 2,4-dichlorophenoxy, 2,4-dibromophenoxy, 2,4,5-trichlorophenoxy.

Lower alkyl and lower alkoxy radicals $R_5$ to $R_7$ have from one to four carbon atoms. As halogenalkyl, trifluormethyl is preferred. The alkyl substituents in a dialkylamino group are radicals having one to four carbon atoms in particular the methyl radical. By halogen represented by $R_5$, $R_6$ and/or $R_7$ is meant fluorine, chlorine, bromine and iodine, especially however, fluorine, chlorine and/or bromine.

The new O,N-diphenyl-carbamic acid esters are obtained according to the invention, either (a) by converting a phenol of the Formula II

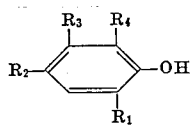

(II)

as such or in the Form of one of its alkali metal or alkaline earth metal salts,
with phosgene or thiophosgene into an acid chloride of the Formula III

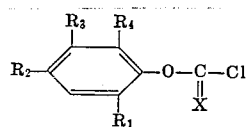

(III)

and reacting this with an aniline of the Formula IV

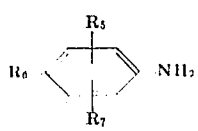

(IV)

or (b) in those cases in which X represents oxygen, by reacting said phenol of Formula II, as such or in the form of one of its alkali metal or alkaline earth metal salts,
with a phenyl isocyanate of the Formula V

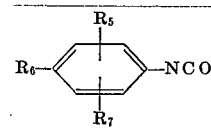

(V)

In the Formulas I to V, the symbols $R_1$ to $R_7$ and X have the meanings given for Formula I.

The process according to the invention is preferably carried out in the presence of a solvent or diluting agent and of an acid-binding agent (proton acceptor).

Examples of suitable solvents or diluting agents are: hydrocarbons, such as toluene, benzene or ligroine, halogenated hydrocarbons, such as chloroform, carbon tetrachloride or chlorobenzene, amides such as dimethylformamide, ethers and ether-like compounds such as tetrahydrofuran, dioxan or diisopropylether, ketones such as acetone or methyl-ethylketone. Acid-binding agents are preferably organic bases, e.g., tertiary amines such as pyridine, triethylamine etc., inorganic bases such as the hydroxides and carbonates of alkali metals and alkaline earth metals.

In the following examples, the production of some of the diphenyl-carbamic acid esters of Formula I is described. The temperatures are given in degrees centigrade.

EXAMPLE 1 a. About 100 g of phosgene are introduced at 0° into 500 ml of toluene. To this solution there is added dropwise at 0° to 5°, a solution of 289.5 g of 4,2',4'-trichloro-2-hydroxy-diphenyl ether in 700 ml of toluene, and 100 g more of phosgene are introduced. While stirring, a solution of 111.3 g of triethyl amine in 200 ml of toluene is then added to the reaction mixture. After standing for several hours at room temperature, the excess phosgene is removed, the triethylamine-hydrochloride is separated, and the solvent is removed from the filtrate. The residue is fractionated, the 0-[2-(2',4'-dichlorophenoxy)-5-chlorophenyl]-carbonyl chloride boils at 180°-184° and 0.5 Torr.

b. 35.2 g of 0-[2-(2',4'-dichlorophenoxy)-5-chlorophenyl]-carbonyl chloride, dissolved in 300 ml of acetone, are treated dropwise at 15° to 20° with a solution of 32.4 g of 3,5-dichloraniline in 150 ml of acetone. The reaction mixture is then allowed to stand for 3 hours at room temperature, poured onto water, and the precipitate which separates out after several hours is removed by filtration. After recrystallizing several times from cyclohexane and benzene/peteroleum ether, N-(3,5-dichlorophenyl)-carbamic acid-0-[2-(2',4'-di-chlorophenoxyl)-5-chlorophenyl]-ester having a melting point of 132°-134° is obtained.

EXAMPLE 2 a. A solution of 150 g of thiophosgene in 400 ml of chloroform is added to a solution of 289.5 g of 2',4'-dichloro-2-hydroxy-4-chloro-diphenyl ether in 400 ml of chloroform, and cooled to 5°. While stirring vigorously, an aqueous sodium hydroxide solution, 50 g of sodium hydroxide dissolved in 790 ml of water, is then added dropwise in such a manner that the temperature does not exceed 15°. The reaction mixture is then stirred for 2 hours at room temperature, the organic phase is separated, washed with water, and dried over sodium sulfate. After the solvent is removed by distillation, the residue is fractionated in vacuum. The 2-(2',4'-dichlorophenoxy)-5-chlorophenyl-thiocarbonyl chloride boils at 175°–184° 0.05 Torr. ($n_D^{20}$ = 1.6275).

b. A solution of 24.2 g of 3,5-dimethylaniline in 150 ml of benzene is added dropwise at 5° during 1.5 hours to a solution of 36 g of O-[2-(2',4'-dichlorophenoxy)-5-chlorophenyl]-thiocarbonylchloride in 150 ml of benzene. The mixture is then stirred for 12 hours at room temperature, shaken out with water, and dried over sodium sulfate. After the solvent has been removed by distillation, the residue of the O-[2-(2',4'-dichlorophenoxy)-5-chlorophenyl]-thiocarbamic acid-N-(3,5-di-methylphenyl)-ester, recrystallized from benzene/petroleum ether, has a melting point of 102°–104°.

EXAMPLE 3

A solution of 19.8 g of 3-bromo-phenyl-isocyanate in 50 ml of ligroin is added dropwise to a suspension of 30 g of 4'-bromo-4-chloro-2-hydroxy-diphenyl ether in 100 ml of ligroin. After the addition of 2 ml of triethylamine, the mixture is refluxed for 1 hour and then cooled. The precipitate which separates is separated, and recrystallized from benzene/petroleum ether (1:1).

The N-(3-bromophenyl)-carbamic acid-O-[2-(4-bromophenoxy)-5-chlorophenyl]-ester has a melting point of 116°.

The following O,N-diphenyl-carbamic acid esters are prepared from the correspondingly substituted 2-hydroxy-diphenyl ethers or 2-phenoxyphenyl-carbonyl chlorides in accordance with the procedures described in the foregoing examples.

TABLE 1

| No. | Compound | Melting Point |
|---|---|---|
| 1 | N-(4-fluorophenyl)-carbamic acid-O-[2-(4'-chlorophenoxy)-5-chlorophenyl]- ester | 128–130° |
| 2 | N-(3-chlorophenyl)-carbamic acid-O-[2-(4'-chlorophenoxy)-5-chlorophenyl]-ester | 112–113° |
| 3 | N-(3-bromophenyl)-carbamic acid-O-[2-(4'-chlorophenoxy)-5-chlorophenyl]-ester | 99–100° |
| 4 | N-(4-chlorophenyl)-thiocarbamic acid-O-[2-(4'-chlorophenoxy)-5-chlorophenyl]-ester | 100–102° |
| 5 | N-(3-bromophenyl)-thiocarbamic acid-O-[2-(4'-chlorophenoxy)-5-chlorophenyl]-ester | 105–107° |
| 6 | N-(2,4-dichlorophenyl)-carbamic acid-O-[2-(4'-chlorophenoxy)-5-chlorophenyl]-ester | 116–117° |
| 7 | N-(3,4-dichlorophenyl)-carbamic acid-O-[2-(4'-chlorophenoxy)-5-chlorophenyl]-ester | 146–147° |
| 8 | N-(3-trifluoromethylphenyl)-carbamic acid-O-[2-(4'-chlorophenoxy)-5-chlorophenyl]-ester | 82–83° |
| 9 | N-(3-trifluoromethyl-4-chlorophenyl)-carbamic acid-O-[2-(4'-chlorophenoxy)-5-chlorophenyl]-ester | 179–180° |
| 10 | N-(3-trifluoromethyl-4-chlorophenyl)-thiocarbamic acid-O-[2-(4'-chlorophenoxy)-5-chlorophenyl]-ester | 98–100° |
| 11 | N-(3-trifluoromethyl-6-chlorophenyl)-thiocarbamic acid-O-[2-(4'-chlorophenoxy)-5-chlorophenyl]-ester | 95–97° |
| 12 | N-(4-methylphenyl)-carbamic acid-O-[2-(4'-chlorophenoxy)-5-chlorophenyl]-ester | 102–104° |
| 13 | N-(4-methylphenyl)-thiocarbamic acid-O-[2-(4'-chlorophenoxy)-5-chlorophenyl]-ester | 131–133° |
| 14 | N-(2-methylphenyl)-thiocarbamic acid-O-[2-(4'-chlorophenoxy)-5-chlorophenyl]-ester | 92–96° |
| 15 | N-(3,5-dimethylphenyl)-thiocarbamic acid-O-[2-(4'-chlorophenoxy)-5-chlorophenyl]-ester | 101–102° |
| 16 | N-(3-methoxyphenyl)-carbamic acid-O-[2-(4'-chlorophenoxy)-5-chlorophenyl]-ester | 76–77° |
| 17 | N-(3-methoxyphenyl)-thiocarbamic acid-O-[2-(4'-chlorophenoxy)-5-chlorophenyl]-ester | 84–86° |
| 18 | N-(4-chlorophenyl)-carbamic acid-O-[2-(4'-bromophenoxy)-5-chlorophenyl]-ester | 150–151° |
| 19 | N-(3-bromophenyl)-carbamic acid-O-[2-(4'-bromophenoxy)-5-chlorophenyl]-ester | 116° |
| 20 | N-(3,4-dichlorophenyl)-carbamic acid-O-[2-(4'-bromophenoxy)-5-chlorophenyl]-ester | 142–143° |
| 21 | N-(3-trifluoromethylphenyl)-carbamic acid-O-[2-(4'-bromophenoxy)-5-chlorophenyl]-ester | 84–86° |
| 22 | N-(2-methylphenyl)-carbamic acid-O-[2-(4'-bromophenoxy)-5-chlorophenyl]-ester | 98° |
| 23 | N-(3-chlorophenyl)-carbamic acid-O-[2-(4'-chlorophenoxy)-5-bromophenyl]-ester | 116–118° |
| 24 | N-(2,4-dichlorophenyl)-carbamic acid-O-[2-(4'-chlorophenoxy)-5-bromophenyl]-ester | 122–124° |
| 25 | N-(trifluoromethyl-4-chlorophenyl)-carbamic acid-O-[2-(4'-chlorophenoxy)-5-bromophenyl]-ester | 136–138° |
| 26 | N-(3,5)-bis-(trifluoromethylphenyl)-carbamic acid-O-[2-(4'-chlorophenoxy)-5-bromophenyl]-ester | 129° |
| 27 | N-(3-methoxyphenyl)-carbamic acid-O-[2-(4'-chlorophenoxy)-5-bromophenyl]-ester | 76° |
| 28 | N-(3,4-dichlorophenyl)-carbamic acid-O-[2-(4'-bromophenoxy)-5-bromophenyl]-ester | 152–154° |
| 29 | N-(3-trifluoromethylphenyl)-carbamic acid-O-[2-(4'-bromophenoxy)-5-bromophenyl]-ester | 88–89° |
| 30 | N-(3-methylphenyl)-carbamic acid-O-[2-(4'-bromophenoxy)-5-bromophenyl]-ester | 114–116° |
| 31 | N-(4-methoxyphenyl)-carbamic acid-O-[2-(2-(4'-bromophenoxy)-5-bromophenyl]-ester | 135–137° |
| 32 | N-(4-chlorophenyl)-carbamic acid-O-[2-(4'-chlorophenoxy)-4-bromo-5-chlorophenyl]-ester | 155–160° |
| 33 | N-(3-chlorophenyl)-carbamic acid-O-[2-(4'-chlorophenoxy)-4-bromo-5-chlorophenyl]-ester | 120–121° |
| 34 | N-(3-bromophenyl)-carbamic acid-O-[2-(4'-chlorophenoxy)-4-bromo-5-chlorophenyl]-ester | 120–121° |
| 35 | N-(4-bromophenyl)-thiocarbamic acid-O-[2-(4'-chlorophenoxy)-4-bromo-5-chlorophenyl]-ester | 127–128° |
| 36 | N-(3,4-dichlorophenyl)-carbamic acid-O-[2-(4'-chlorophenoxy)-4-bromo-5-chlorophenyl]-ester | 162–163° |
| 37 | N-(3-trifluoromethyl-4-chlorophenyl)-carbamic acid-O-[2-(4'-chlorophenoxy)-4-bromo-5-chlorophenyl]-ester | 145–147° |
| 38 | N-(3-trifluoromethylphenyl)-carbamic acid-O-[2-(4'-chlorophenoxy)-4-bromo-5-chlorophenyl]-ester | 122–124° |
| 39 | N-(3-trifluoromethylphenyl)-thiocarbamic acid-O-[2-(4'-chlorophenoxy)-4-bromo-5-chlorophenyl]-ester | 75–77° |
| 40 | N-(4-methylphenyl)-carbamic acid-O-[2-(4'-chlorophenoxy)-4-bromo-5-chlorophenyl]-ester | 135–138° |
| 41 | N-(3-methoxyphenyl)-carbamic acid-O-[2-(4'-chlorophenoxy)-4-bromo-5-chlorophenyl]-ester | 150–151° |
| 42 | N-(3,4-dichlorophenyl)-carbamic acid-O-[2-(4'-bromophenoxy)-4,6-dibromophenyl]-ester | 162–167° |
| 43 | N-phenyl-carbamic acid-O-[2-(2',4'-dichlorophenoxy)-5-chlorophenyl]-ester | 150–151° |
| 44 | N-phenyl-thiocarbamic acid-O-[2-(2',4'-dichlorophenoxy)-5-chlorophenyl]-ester | 105–107° |
| 45 | N-(4-fluorophenyl)-carbamic acid-O-[2-(2',4'5-chlorophenyl]-ester | 144–146° |
| 46 | N-(2-chlorophenyl)-carbamic acid-O-[2-(2',4'5-chlorophenyl]-ester | 105–107° |
| 47 | N-(4-chlorophenyl)-carbamic acid-O-[2-(2',4'5-chlorophenyl]-ester | 153–154° |
| 48 | N-(4-chlorophenyl)-thiocarbamic acid-O-[2-(2',4'5-chlorophenyl]-ester | 98–101° |
| 49 | N-(2-bromophenyl)-carbamic acid-O-[2-(2',4'5-chlorophenyl]-ester | 110–111° |

| No. | Compound | M.p. |
|---|---|---|
| 50 | N-(3-bromophenyl)-carbamic acid-O-[2-(2',4'5-chlorophenyl]-ester | 126–128° |
| 51 | N-(4-bromophenyl)-carbamic acid-O-[2-(2',4'5-chlorophenyl]-ester | 159–160° |
| 52 | N-(4-bromophenyl)-thiocarbamic acid-O-[2-(2',4'5-chlorophenyl]-ester | 106–107° |
| 53 | N-(3,4-dichlorophenyl)-carbamic acid-O-[2-(2',4'5-chlorophenyl]-ester | 145–147° |
| 54 | N-(3,5-dichlorophenyl)-carbamic acid-O-[2-(2',4'5-chlorophenyl]-ester | 132–134° |
| 55 | N-(3,4-dichlorophenyl)-thiocarbamic acid-O-[2-(2',4'-dichlorophenoxy)-5-chlorophenyl]-ester | 99–102° |
| 56 | N-(2,4,5-trichlorophenyl)-thiocarbamic acid-O-[2-(2',4'-dichlorophenoxy)-5-chlorophenyl]-ester | 80–82° |
| 57 | N-(3-trifluoromethyl-4-chlorophenyl)-carbamic acid-O-[2-(2',4'-dichlorophenoxy)-5-chlorophenyl]-ester | 125–126° |
| 58 | N-(2-methyl-3-chlorophenyl)-carbamic acid-O-[2-(2',4'-dichlorophenoxy)-5-chlorophenyl]-ester | 137–138° |
| 59 | N-(3-nitro-4-chlorophenyl)-carbamic acid-O-[2',4'-dichlorophenoxy)-5-chlorohenyl]-ester | 150–152° |
| 60 | N-(2,4,5-trichlorophenyl)-carbamic acid-O-[2-(2',4'-dichlorophenoxy)-5-chlorophenyl]-ester | 145–147° |
| 61 | N-(3-trifluoromethylphenyl)-carbamic acid-O-[2-(2',4'-dichlorophenoxy)-5-chlorophenyl]-ester | 120–121° |
| 62 | N-(4-hydroxyphenyl)-carbamic acid-O-[2-(2',4'5-chlorophenyl]-ester | 149°150° |
| 63 | N-(4-ethoxyphenyl)-carbamic acid-O-[2-(2',4'5-chlorophenyl]-ester | 145–147° |
| 64 | N-(3-hydroxyphenyl)-carbamic acid-O-[2-(2',4'5-chlorophenyl]-ester | 136–137° |
| 65 | N-(4-dimethylaminophenyl)-carbamic acid-O-[2-(2',4'-dichlorophenoxy)-5-chorophenyl]-ester | 148–149° |
| 66 | N-(3,5-bis-trifluoromethyl-phenyl)-carbamic acid-O-[2-(2',4'-dichlorophenoxy)-5-chlorophenyl]-ester | 128° |
| 67 | N-(2-methylphenyl)-carbamic acid-O-[2-(2',4'5-chlorophenyl]-ester | 115–118° |
| 68 | N-(3-methylphenyl)-carbamic acid-O-[2-(2',4'5-chlorophenyl]-ester | 137–138° |
| 69 | N-(4-methylphenyl)-carbamic acid-O-[2-(2',4'5-chlorophenyl]-ester | 144–145° |
| 70 | N-(2,6-dimethylphenyl)-carbamic acid-O-[2-(2',4'5-chlorophenyl]-ester | 122–124° |
| 71 | N-(3,5-dimethylphenyl)-carbamic acid-O-[2-(2',4'5-chlorophenyl]-ester | 142–145° |
| 72 | N-(4-tert-butylphenyl)-carbamic acid-O-[2-(2',4'5-chlorophenyl]-ester | 153–154° |
| 73 | N-(4-methylphenyl)-thiocarbamic acid-O-[2-(2',4'5-chlorophenyl]-ester | 94–96° |
| 74 | N-(3-methylphenyl)-thiocarbamic acid-O-[2-(2',4'5-chlorophenyl]-ester | 107–109° |
| 75 | N-(2-methoxyphenyl)-carbamic acid-O-[2-(2',4'5-chlorophenyl]-ester | 107–108° |
| 76 | N-(3-methoxyphenyl)-carbamic acid-O-[2-(2',4'5-chlorophenyl]-ester | 109–110° |
| 77 | N-(4-methoxyphenyl)-carbamic acid-O-[2-(2',4'5-chlorophenyl]-ester | 150–151° |
| 78 | N-(3-methoxyphenyl)-thiocarbamic acid-O-[2-(2',4'-dichlorophenoxy)-5-chlorophenyl]-ester | 96–98° |
| 79 | N-(4-fluorophenyl)-carbamic acid-O-[2-(2',4''-trichlorophenoxy)-5-chlorophenyl]-ester | 132–134° |
| 80 | N-(4-methoxyphenyl)-carbamic acid-O-[2-(2',4'5'-trichlorophenoxy)-5-chlorophenyl]-ester | 140–141° |
| 81 | N-(3-trifluoromethyl-4-chlorophenyl)-carbamic acid-O-[2-(2',4',5'-trichlorophenoxy)-5-chlorophenyl]-ester | 136–137° |
| 82 | N-(4-fluorophenyl)-carbamic acid-O-[2-(2',4'5-bromophenyl]-ester | 114° |
| 83 | N-(3,4-dichlorophenyl)-carbamic acid-O-[2-(2',4'5-bromophenyl]-ester | 148–151° |
| 84 | N-(3-trifluoromethylphenyl)-carbamic acid-O-[2-(2',4'-dichlorophenoxy)-5-bromophenyl]-ester | 114–116° |
| 85 | N-(3-trifluoromethyl-4-chlorophenyl)-carbamic acid-O-[2-(2',4'-dichlorophenoxy)-5-bromophenyl]-ester | 114–115° |
| 86 | N-(3-methoxyphenyl)-carbamic acid-O-[2'2-(2',4'-dichlorophenoxy)-5-bromophenyl]-ester | 80–110° |
| 87 | N-(3-bromophenyl)-carbamic acid-O-[2-(2',4'5-chlorophenyl]-ester | 142–143° |
| 88 | N-(2,4-dichlorophenyl)-carbamic acid-O-[2-(2',4'5-chlorophenyl]-ester | 126–128° |
| 89 | N-(3,5bis-trifluoromethyl-phenyl)-carbamic acid-O-[2-(2',4'-dibromophenoxy)-5-chlorophenyl]-ester | 145–146° |
| 90 | N-(4-methylphenyl)-carbamic acid-O-[2-(2',4'5-chlorophenyl]-ester | 160–161° |
| 91 | N-(2-methylphenyl)-carbamic acid-O-[2',4'-dichlorophenoxy)-4-bromo-5-chlorophenyl]-ester | 158–160° |
| 92 | N-(3-chlorophenyl)-carbamic acid-O-[2-(2',4'4-bromo-5-chlorophenyl]-ester | 138–139° |
| 93 | N-(4-chlorophenyl)-carbamic acid-O-[2-(2',4'4-bromo-5-chlorophenyl]-ester | 184–185° |
| 94 | N-(2,4-dichlorophenyl)-carbamic acid-O-[2-(2',4'4-bromo-5-chlorophenyl]-ester | 134–135° |
| 95 | N-(3,4-dichlorophenyl)-carbamic acid-O-[2-(2',4'4-bromo-5-chlorophenyl]-ester | 172–173° |
| 96 | N-(2,4,5-trichlorophenyl)-carbamic acid-O-[2-(2',4'-dichlorophenoxy)-4-bromo-5-chlorophenyl]-ester | 170–172° |
| 97 | N-(2-chlorophenyl)-carbamic acid-O-[2-(2',4'4-bromo-5-chlorophenyl]-ester | 150–153° |
| 98 | N-(3-trifluoromethyl-6-chlorophenyl)-carbamic acid-O-[2-(2',4'-dichlorophenoxy)-4-bromo-5-chlorophenyl]-ester | 140–141° |
| 99 | N-(3-bromophenyl)-carbamic acid-O-[2-(2',4'4-bromo-5-chlorophenyl]-ester | 144–145° |
| 100 | N-(3-trifluoromethyl-4-chlorophenyl)-carbamic acid-O-[2-(2',4'-dichlorophenoxy)-4-bromo-5-chlorophenyl]-ester | 151–153° |
| 101 | N-(4-methylphenyl)-carbamic acid-O-[2-(2',4'4-bromo-5-chlorophenyl]-ester | 148–153° |
| 102 | N-(3-methoxyphenyl)-carbamic acid-O-[2-(2',4'4-bromo-5-chlorophenyl]-ester | 139–141° |

The new carbamic acid esters of Formula I are colorless solids which can be purified by recrystallization. They are only slightly toxic for warm-blooded animals and do not irritate the skin in the concentrations normal for use. The advantage of the new carbamic acid esters to be colorless or to have only a slight intrinsic color makes possible their use in many areas where strongly colored compounds would be unsuitable.

The new diphenyl-carbamic acid esters of Formula I have very good bacterostatic and bactericidal effects against gram-positive and gram-negative bacteria, for example: *Staphylococcus aureus* SG 511 *Staphylococcus aureus* Smith, *Staphylococcus lactis*, in addition *Bacillus mesentericus*, *Bacillus pumilus*, *Bacillus subtilis*, Coli forms, *Corynebacterium diphtheriae*, *Clostridium botulinum*, *Clostridium butyricum*, *Clostridium welchii*, *Clos-* tridium tetani, Klebsiella pneumoniae, Alcaligenes faecalis, Sarcina spec., Salmonella pullorum, Salmonella typhi, Salmonella paratyphi A and B, Salmonella typhimurium, Salmonella enteritidis, Shigella dysenteriae, Shigella flexnerl, Brucella abortus, Proteus mirabilis, Achromobacter spec., Serratia marcescens, Pasteurella pseudotuberculosis. The compounds of Formula I also have very good activity against fungi, for example against the following fungi: Aspergillus spec. e.g., Aspergillus niger, Aspergillus flavus, Aspergillus fumigatus, Candida spec. e.g., Candida albicans, Candida tropicalis, Pencillium spec., for example Penicillium italicum, Penicillium chrysogenum, Epidermophyton spec., Trichophyton spec., Ctenomyces spec., Keratinomyces spec., Blastomyces spec., Microsporum spec., Cryptococcus neoformans var., Torulopsis spec., Alternaria tenuis, Acrostalagmus cinnabarinus, Fusarium oxysporum, cellulose-degrading fungi, wood fungi, etc.

O-phenoxyphenyl-N-trifluoromethylphenyl carbamic acid esters which are unsubstituted in the phenoxy group are embraced by the Dutch Pat. application open to public inspection No. 6,606,753 as anthelminths, not however being described. These compounds however have no, or only very weak microbicidal properties. In addition a series of O-halogenophenyl-N-phenyl-carbamic acid esters or O-phenyl-N-halogenophenyl-carbamic acid esters are described as herbicides and for use in plant protection. These compounds are, however, due to their lack of effect or lack of broad enough range of action, unsuitable, especially for the control of pathogenic microorganisms, for example of the urinal track and intestines of warm-blooded animals.

To determine the bacteriostatic and fungistatic action of the compounds of Formula I, the following microorganisms were used:

A. Bacteria

Escherichia coli, Bacillus pumilus, Sarcina ureae, Bacillus subtilis, Sarcina lutea, Streptococcus faecalis, Staph. saproph., Staph. aureus, Corynebact. diphtheroides 17, Brevibact. ammoniagenes, Salmonella pullorum, Proteus vulgaris HXL, Proteus vulgaris ox 19, Proteus mirabilis;

B. Fungi

1a Aspergillus niger, Penicillium italicum, Fusarium oxysporum, Candida albicans, Stemphylium botryosum, 1b cellulose-degraders: Chaetomium globosum, Trichoderma viride, Metarrhizium glutinosum, Stachybotrys atra, 2 yeast: Saccharomyces cerevisiae, Torula utilis, Monilia nigra, 3 facultative Dermatophytes Trichophyton gypseum, Ctenomyces spec., Keratinomyces ajelloi, Epidermophyton floccosum, 4 ubiquitous Saprophytes: Rhizopus nigricans, Paecilomyces varioti, Penicillium citrinum, Aspergillus oryzae, Aspergillus clavatus, Aspergillus flavus.

5 Fungi imperfecti: Scopulariopsis brevicaulis, Alternaria tenuis, Acrostalagmus cinnabarinus, 6 Coniophora cerebella, Poria vaporaria, Poria incarnata, 7 Polystictus versicolor, Daedelea quericina, Lencites abietinam Lentinus lepideus, 8 parasites: Fomes annosus 9 blue stain: Scoplularia phycomyces, Pullularia pullulans.

C. Method

The lowest growth-inhibiting concentration for the various microorganisms was determined by mixing the solution of active substance with nutrient agar while still warm. The agar is then poured into plates and, after solidification, inoculated with the test germs.

In the following table are listed: the nutrient media used for the various organisms, the incubation temperature and incubation time, as well as the concentration of the active substances used:

| Organisms | Nutrient medium | Incubation temp | time | Concentration of active substance in ppm * |
|---|---|---|---|---|
| A Bacteria | Nutrient agar | 37° | 48 hrs | 30–10–3–1 |
| B Fungi 1a) | Nutrient agar | 37° | 48 hrs | 100–30–10–3 |
| B Fungi 1. b | Maltose-agar & oats | 28° | 5 days | 100–30–10 |
| 2. | Wort-agar | 28° | 5 days | 100–30–10 |
| 3. | Sabouraud Dextrose-agar | 28° | 10 days | 100–30–10 |
| 4. and 5. | Sabouraud Maltose-agar | 28° | 5 days | 100–30–10 |
| 6– 9 | Sabouraud Maltose-agar | 28° | 7 days | 100–30–10 |

* ppm: parts of active substance per 10⁶ parts of agar

In the following Table 2, the bacteriostatic action, and in Table 3, the fungistatic action of some of the compounds listed in Table 1 on some of the previously listed microorganisms are given.

TABLE 2

| Compound number Table 1 | Staphylococcus aureus SG 511 | Staphylococcus aureus ATCC 6538 | Staphylococcus saproph. NCTC 7292 | Bacillus pumilus Fey | Bacillus subtilis NCTC | Sarcina ureae | Sarcina lutea NCTC 196 | Streptococcus faecalis NCTC 8619 | Corynebact. diphteroides 17 | Brevibacterium ammon. ATCC 6871 | Escherichia coli NCTC 8196 | Salmonella pullorum VBIZ | Proteu sp. |
|---|---|---|---|---|---|---|---|---|---|---|---|---|---|
| 1 | 10 | 30 | 3 | 10 | 10 | 30 | | 30 | 30 | 30 | 1 | <10 | <10 |
| 2 | 10 | 10 | 3 | 10 | 10 | 30 | 30 | 30 | 30 | 10 | 1 | <10 | <10 |
| 3 | 1 | 30 | 10 | 10 | 10 | 10 | 30 | 30 | 30 | 30 | 1 | 10 | <10 |
| 4 | 1 | 30 | 30 | 10 | 10 | 10 | 30 | 30 | 30 | 10 | 1 | 30 | <10 |
| 5 | 1 | 10 | 3 | 10 | 10 | 10 | 30 | 30 | 10 | 10 | 1 | <10 | <10 |
| 7 | 3 | 10 | 3 | 3 | 10 | 10 | 30 | 10 | 10 | 10 | 1 | <10 | <10 |
| 10 | 1 | 3 | 3 | 3 | 10 | 3 | 3 | 3 | 3 | <1 | 1 | <10 | <10 |
| 11 | 1 | 30 | 30 | 10 | 10 | | 30 | 30 | 30 | 30 | 1 | 30 | <10 |
| 12 | 3 | 10 | 10 | 10 | 10 | 10 | 30 | 30 | 10 | 10 | 10 | <10 | <10 |
| 13 | 1 | 10 | 10 | 10 | 10 | 30 | >30 | 30 | 30 | 10 | 1 | <10 | <10 |
| 16 | 10 | 10 | 10 | 10 | 10 | 10 | 30 | 30 | <10 | 10 | 10 | <10 | <10 |
| 34 | 3 | 3 | 10 | 1 | 10 | 10 | 30 | 10 | 10 | 3 | 10 | <10 | 30 |
| 35 | 3 | 3 | 3 | 1 | 10 | 3 | 3 | 3 | 10 | 3 | 3 | 30 | 30 |
| 36 | 3 | 3 | 3 | 1 | 3 | 10 | 30 | 10 | 10 | 3 | 10 | 30 | 30 |
| 40 | 1 | <1 | 3 | 1 | 3 | 3 | 3 | 3 | 10 | <1 | 10 | <10 | <10 |
| 41 | 3 | 3 | 3 | 1 | 3 | 10 | 30 | 10 | 10 | 3 | 10 | <10 | 30 |
| 43 | 1 | 3 | <1 | 3 | 3 | 10 | 10 | 10 | 10 | 10 | 1 | <10 | <10 |
| 44 | 1 | 3 | <1 | 3 | 3 | 10 | 10 | 10 | 10 | 10 | 1 | <10 | <10 |
| 45 | 1 | 10 | 3 | 3 | 3 | 10 | >30 | 10 | 10 | 10 | 1 | <10 | <10 |

TABLE 2—Continued

| Compound number Table 1 | Staphylococcus aureus SG 511 | Staphylococcus aureus ATCC 6538 | Staphylococcus saproph. NCTC 7292 | Bacillius pumilus Fey | Bacillus subtilis NCTC | Sarcina ureae | Sarcina lutea NCTC 196 | Streptococcus faecalis NCTC 8619 | Corynebact. diphteroides 17 | Brevibacterium ammon. ATCC 6871 | Escherichia coli NCTC 8196 | Salmonella pullorum VBIZ | Proteus sp. |
|---|---|---|---|---|---|---|---|---|---|---|---|---|---|
| 46 | 3 | 10 | 10 | 3 | 10 | 30 |  | 10 | 10 | 10 | 1 | <10 | <10 |
| 47 | 3 | 3 | 10 | 1 | 10 | 3 |  | 10 | 10 | 3 | 1 | <10 | <10 |
| 48 | 1 | 3 | <1 | 10 | 3 | 10 | 10 | 10 | 10 | 10 | 1 | <10 | <10 |
| 49 | 3 | 10 | 10 | 3 | 10 | 30 |  | 10 | 10 | 10 | 1 | <10 | <10 |
| 50 | 1 | 10 | 3 | 3 | 3 | 30 |  | 10 | 10 | 10 | 1 | <10 | <10 |
| 51 | 1 | 3 | 10 | 3 | 10 | 10 | 10 | 10 | 10 | 10 | 1 | <10 | <10 |
| 52 | 1 | 3 | <1 | 10 | 3 | 30 | 10 | 10 | 10 | 10 | 1 | <10 | <10 |
| 53 | 3 | 3 | 10 | 1 | 10 | 10 |  | 10 | 10 | 3 | 1 | <10 | <10 |
| 54 | 1 | 10 | 10 | 3 | 3 | 10 |  | 3 |  | 10 | 1 | <10 | <10 |
| 55 | 1 | 10 | <1 | 3 | 3 | 10 |  | 10 | 10 | 3 | 1 | <10 | <10 |
| 56 | 1 | 10 | <1 | 3 | 3 | 10 |  | 10 | 10 | 3 | 1 | <10 | <10 |
| 57 | 1 | 10 | 10 | 3 | 3 | 10 | 10 | 10 | 10 | 3 | 1 | <10 | <10 |
| 61 | 1 | <1 | <1 | 3 | 10 | 10 | 10 | 10 | 10 | 10 | 1 | <10 | <10 |
| 67 | 3 | 10 | <1 | 3 | 10 |  | 10 | 10 | 10 | 10 | 3 | <10 | <10 |
| 68 | 1 | 3 | 10 | 3 | 10 | 10 | 10 | 10 | 10 | 10 | 1 | <10 | <10 |
| 69 | 1 | 3 | <1 | 3 | 3 | 10 | 10 | 10 | 10 | 10 | 1 | <10 | <10 |
| 73 | 1 | <1 | <1 | 3 | 3 | 10 | 10 | 10 | 10 | 10 | 1 | <10 | <10 |
| 74 | 1 | 3 | <1 | 3 | 10 | 10 | 10 | 10 | 10 | 10 | 1 | <10 | <10 |
| 75 | 10 | 10 | 10 | 1 | 10 | 10 |  | 10 | 10 | 10 | 1 | <10 | <10 |
| 76 | 3 | <1 | 10 | 3 | 3 | 10 | 10 | 10 | 10 | 3 | 1 | <10 | <10 |
| 77 | 1 | 3 | 10 | 3 | 10 | 10 | 10 | 10 | 10 | 10 | 1 | <10 |  |
| 78 | 1 | 3 | <1 | 3 | 3 | 10 | 10 | 10 | 10 | 10 | 1 | <10 | <10 |
| 91 | 1 | <1 | <1 | 1 | <1 | 3 | <1 | <1 | 10 | <1 | 3 | <10 | <10 |
| 92 | 1 | <1 | <1 | 1 | 3 | 10 | 10 | 3 |  | <1 | 10 | <10 | <10 |
| 93 | 1 | 3 | <1 | 1 | 3 | 10 |  | 3 | 10 | 3 | 10 | <10 | 30 |
| 94 | 1 | 10 | <1 | 3 | 1 |  |  | 3 | 10 | <1 | 3 | <10 |  |
| 95 | 1 | <1 | 3 | 1 | 3 | 10 |  |  | 3 | 10 | <1 | 10 | <10 |
| 99 | 1 | <1 | 3 | 1 | 3 | 3 | 10 | 3 | 10 | <1 | 3 | <10 | 10 |
| 101 | 1 | <1 | <1 | 1 | 1 | <1 | <1 | 1 | 10 | <1 | 3 | <10 | <10 |
| 102 | 1 | <1 | 3 | 1 | 3 | 1 | 3 | 3 | 10 | <1 | 3 | <10 | <10 |

TABLE 3

| Compound Number Table 1 | Aspergillus niger | Aspergillus flavus | Penicillium italicum | Fusarium oxysporum | Candida albicans | Dermatophyten | Rhizopus nigricans | Paecilomyces varioti | Fungi imperfecti | Pullularia pullulans |
|---|---|---|---|---|---|---|---|---|---|---|
| 1 | 100 | 100 | 100 | 10 | 30 | <10 | <10 | 30 | <10-30 | 30 |
| 2 | 100 | 30 | 30 | 30 | 100 | <10 | <10 | 30 | <10-30 | 30 |
| 3 | 100 | 100 | 30 | 10 | 30 | <10 | <10 | 30 | <10-30 | 30 |
| 4 | 100 | 100 | 100 | 30 | 30 | <10 | 100 | 30 | <10-30 |  |
| 5 | 100 | 100 | 30 | 30 | 30 | <10 | 30 | 30 | <10-30 | 30 |
| 6 | 100 | 100 | 30 | 10 | 30 | <10 | <10 | 30 | <10-30 | 100 |
| 7 | 100 | 100 | 30 | 30 | 30 | <10 | <10 |  | <10-30 | 30 |
| 9 | 100 | 100 | 30 | 10 | 30 | <10 | <10 | 100 | <10-30 | 30 |
| 10 | 100 | 100 | 30 | 30 | 30 | <10 | 30 | 30 | 30 | 30 |
| 12 | 100 | 100 | 30 | 30 | 30 | <10 | <10 | 30 | 30 | 30 |
| 13 | 100 | 100 | 30 | 30 | 30 | <10 | 30 | 100 | <10 | 30 |
| 34 | 30 | 30 | 10 | 10 | 10 | <10 | <10 | 30 | <10 | 10 |
| 35 | 100 | 30 | 10 | 10 | 30 | <10 | 30 | 30 | <10 | 30 |
| 36 | 30 | 30 | 10 | 10 | 10 | <10 | <10 | 30 | <10 | 30 |
| 37 | 100 | 30 | 10 | 10 | 30 | <10 | <10 | 30 | <10 | 30 |
| 38 | 30 | 30 | 10 | 10 | 30 | <10 | <10 | 30 | <10 | 30 |
| 40 | 100 | 30 | 10 | 30 | 30 | <10 | <10 | <10 | <10 | 30 |
| 41 | 100 | 30 | 10 | 10 | 30 | <10 | <10 | >10 | <10 | <10 |
| 45 | 30 | 30 | 30 | 10 | 30 | <10 | <10 | 30 | <10 | 30 |
| 46 | 30 | 30 | 30 | 10 | 30 | <10 |  |  |  | 30 |
| 47 | 30 |  | 10 | 10 | 30 | <10 |  |  |  | 30 |
| 48 | 100 | 100 | 30 | 30 | 30 | <10 | <10 | 30 | <10 | 30 |
| 49 | 30 | 100 | 30 | 10 | 30 | <10 |  |  |  | 30 |
| 50 | 30 | <10 | 30 | 10 | 30 | <10 | <10 | 100 | <10-30 | 30 |
| 51 | 30 | 100 | 30 | 10 | 30 | <10 | 30 | 30 | <10 | 30 |
| 52 | 100 | 100 | 30 | 30 | 30 | <10 | <10 | 30 | <10 | 30 |
| 53 | 30 | 30 | 10 | 3 | 30 | <10 |  |  |  | 30 |
| 54 |  | 10 | 30 | 30 | 30 | <10 | 30 | 30 | <10 | 30 |
| 55 | 100 | 30 | 30 | 30 | 30 | <10 | 30 | 30 | 30 | 30 |
| 56 | 100 |  | 30 | 10 | 30 | <10 | 30 |  | 30 | 30 |
| 57 | 100 | 30 | 30 | 10 | 30 | <10 | <10 | 30 | <10 | 30 |
| 67 | 30 | 30 | 10 | 30 | 30 | <10 | <10 | 30 | <10 | 30 |
| 68 | 30 | 100 | 30 | 30 | 30 | <10 | <10 | 30 | <10-30 | 30 |
| 73 | 100 | 30 | 30 | 30 | 30 | <10 | <10 | 30 | <10-30 | 30 |
| 74 | 100 | 30 | 30 | 30 | 30 | <10 | 30 | 30 | <10 | 30 |
| 75 | 30 | 30 | 10 | 10 | 30 | <10 |  |  |  | 30 |
| 76 | 30 | 100 | 30 | 30 | 30 | <10 | 30 | 30 | <10-30 | 30 |
| 77 | 30 | 30 | 30 | 30 | 30 | <10 | <10 | 30 | <10-30 | 30 |
| 78 | 100 | 30 | 30 | 30 | 30 | <10 | 30 | 30 | <10 | 30 |
| 91 | 100 | 30 | 10 | 10 |  | <10 | 30 | <10 | <10 | 30 |
| 92 | 100 |  | 10 | 10 | 30 | <10 | 30 | 30 | <10 | 30 |
| 93 | 30 |  | 30 | 10 | 30 | <10 | <10 | 30 | <10 | 30 |
| 94 | 30 |  | 10 | 10 | 30 | <10 | <10 | 30 | <10 | 30 |
| 95 | 30 |  | 10 | 10 | 30 | <10 | <10 | 30 | <10 | 30 |
| 99 | 100 | 100 | 10 | 10 | 30 | <10 | <10 | 30 | <10 | 30 |
| 101 | 100 | 100 | 10 | 10 |  | <10 | 30 | <10 | <10 | 30 |
| 102 | 100 | 100 | 10 | 10 |  | <10 | 30 | <10 | <10 |  |

The bacteriostatic and fungistatic activity of the compounds according to the invention was further determined by the following comparative tests using the method described under (C) above.

The following microorganisms were used

Test 1 a. Bacteria: *Escherichia coli, Bacillus pumilus, Sarcina ureae Staphylococcus aureus, Proteus vulgaris* HXL.

b. Fungi: *Aspergillus niger, Fusarium oxysporum, Candida albicans, Saccharomyces cerevisiae* (yeast), *Torula utilis* (yeast).

Test 2
Bacteria: *Escherichia coli*, *Salmonella pullorum*, *Proteus vulgaris HXL*.

The nutrient media used for the various organisms, the incubation temperature and incubation time, as well as the concentrations of the active substances used are listed in the following table:

| Organism | Nutrient medium | Incubation temp | time | Concentration of active substance in ppm* |
|---|---|---|---|---|
| a) Bakteria | Nutrient-Agar | 37° | 48 hr | 30–10–3–1 1000–300–100 |
| b) Fungi 1. | Nutrient-Agar | 37° | 48 hr | 100–30–10–3 1000–300 |
| 2. | Wort-Agar (for yeasts) | 28° | 5 days | 100–30–10 |

L6 * ppm: Part of active substance per $10^6$ parts of agar.

As comparative substances were used the following compounds:

| | | |
|---|---|---|
| A | N-(3-trifluoromethylphenyl)-carbamic acid-0-(2-phenoxyphenyl)-ester | known from British Pat. No. 1,139,343 |
| B | N-(3,5-bis-trifluoromethylphenyl)-carbamic acid-0-(2-phenoxyphenyl)-ester | |
| C | N-(3-trifluoromethylphenyl)-thiocarbamic acid-0-(2-phenoxyphenyl)-ester | |
| D | N-(3-trifluoromethyl-6-chlorophenyl)-thiocarbamic acid-0-(2-phenoxyphenyl)-ester) | |
| E | mixture of toluene-2,6- and -2,4-bis-(pentachlorophenyl)-carbamate (British Pat. No. 1,122,444) | |
| F | hexamethylene-di-(pentachlorophenyl)-carbamate (British Pat. No. 1,122,444). | |
| G | 3,4-dichlorophenyl-3,4-dichlorocarbanilate (U.S. Pat. No. 3,142,646). | |

In the following Table 4 are given the results of Test 1 and in Table 5 those of Test 2. The figures indicate those concentrations, at which no growth can be determinated.

The disinfectant effect of the compounds according to the invention was determined by means of the following tests A. Germ Count in the Rinse Bath The third rinse bath containing the active substance to be tested was inoculated with *Staphylococcus aureus* SG 511 and *Escherichia coli*. One ml of this bath was added to 20 ml nutritive agar prepared according to MacConkey [Difco Manual 9th Edition, (1953), page 131] when testing *Escherichia coli* and to 20 ml nutritive agar to which 0,5 percent by weight of potassium tellurite had been added when testing *Staphylococcus aureus* SG 511. The resultant mixture was put into Petri dishes which were incubated for 24 hours at 37° C. The viable germ count per mil of rinse bath was determined by counting the number of colonies formed on the agar plates. The results are compiled in Table 6.

TABLE 6

| Bacterium | *Staphylococcus aureus* SG 511 | | *Escherichia coli* | |
|---|---|---|---|---|
| concentration in ppm* | 6,2 | 25 | 6,2 | 25 |
| Compound No. (Table 1) | | | | |
| 3 | 0 | 0 | 1 | 0 |
| 5 | 0 | 0 | 0 | 0 |
| 10 | 0 | 0 | 0 | 0 |
| 46 | 0 | 0 | 1 | 0 |
| 51 | 0 | 0 | 6 | 0 |
| 53 | 0 | 0 | 1 | 0 |
| 55 | 0 | 0 | 0 | 0 |
| E | $10^5$ | 0 | $10^5$ | $10^5$ |
| F | $10^5$ | $10^5$ | $10^5$ | $10^5$ |
| G | $10^5$ | $10^5$ | $10^5$ | $10^5$ |
| Control | $10^5$ | $10^5$ | $10^5$ | $10^5$ |

* 1 part active substance per $10^6$ parts rinse bath

B. Rinse Bath Disinfection Test

TABLE 4

| | Bacteria | | | | | Fungi | | | | |
|---|---|---|---|---|---|---|---|---|---|---|
| Compound number, Table 1 | *Staphylococcus aureus* SG 511 | *Bacillus pumilus* Fey | *Sarcina ureae* | *Escherichia* NCTC 8196 | *Proteus vulparis* | *Aspergillus niger* | *Fusarium oxysporum* | *Candida albicans* | *Saccharomyces cereviase* | *Torula utilis* |
| 8 | 3 | 10 | 10 | 1 | <10 | 100 | 10 | 30 | 100 | 100 |
| 10 | 1 | 3 | 3 | 1 | <10 | 100 | 30 | 30 | 100 | 100 |
| 25 | 1 | 3 | 10 | 1 | <10 | 100 | 30 | 30 | 30 | 30 |
| 38 | 3 | 1 | 3 | 10 | 30 | 30 | 10 | 30 | 30 | 30 |
| 39 | 3 | 1 | 3 | 3 | 30 | 30 | 30 | 30 | 30 | 30 |
| 57 | 1 | 3 | 10 | 1 | <10 | 100 | 30 | 30 | 100 | 30 |
| 81 | 1 | 1 | 3 | 1 | 10 | 30 | 10 | 30 | 30 | 30 |
| 84 | 1 | 3 | 10 | 1 | <10 | 30 | 10 | 30 | 30 | 30 |
| 100 | 1 | 1 | 10 | 10 | <10 | 30 | 10 | 30 | 30 | 30 |
| A | 100 | 100 | >1,000 | 30 | >1,000 | >1,000 | 300 | >1,000 | >1,000 | >1,000 |
| B | 100 | 100 | >1,000 | 100 | >1,000 | >1,000 | 300 | >1,000 | >1,000 | >1,000 |
| C | 100 | 100 | >1,000 | 100 | >1,000 | >1,000 | 300 | >1,000 | >1,000 | >1,000 |
| D | 300 | 100 | 1,000 | 100 | >1,000 | 1,000 | 300 | 300 | 1,000 | >1,000 |
| Control | >1,000 | >1,000 | >1,000 | >1,000 | >1,000 | >1,000 | >1,000 | >1,000 | >1,000 | >1,000 |

Table 5

| Compound No. (table 1) | *Escherichia coli* NCTC 8196 | *Proteus vulgaris* | *Salmonella pullorum* |
|---|---|---|---|
| 3 | 1 | <10 | <10 |
| 5 | 1 | <10 | <10 |
| 10 | 1 | <10 | <10 |
| 46 | 1 | <10 | <10 |
| 51 | 1 | <10 | <10 |
| 53 | 1 | <10 | <10 |
| 55 | 1 | <10 | <10 |
| E | 300 | 300 | 300 |
| F | 300 | 300 | 300 |
| G | 300 | 300 | 300 |
| control | >300 | >300 | >300 |

Raw, unfinished cotton fabric which had not been treated with optical brightening agents was rinsed in the bath described under (A). The cotton fabric was punched into disks of 2.5 cm in diameter. These disks were placed each on one agar plate prepared according to MacConkey, supra, thereby using nutritive agar and nutritive agar containing 0,5 percent by weight of potassium tellurite depending on whether the tests are performed with *Escherichia coli* or *Staphylococcus aureus* SG 511. The agar plates (in Petri dishes) were then incubated for 24 hours at 37° C. The growth on the agar plates was then evaluated visually. The results are compiled in Table 7 wherein + represents growth under the textile sample
− represents no growth under the textile sample
∓ represents traces of growth under the textile sample.

Table 7

| Bacterium | Staphylococcus aureus SG 511 | | Escherichia coli | |
| --- | --- | --- | --- | --- |
| Concentration in ppm* | 6,2 | 25 | 6,2 | 25 |
| Compound No. (Table 1) | | | | |
| 3 | − | − | − | − |
| 5 | − | − | − | − |
| 10 | − | − | − | − |
| 46 | − | − | − | − |
| 51 | − | − | − | − |
| 53 | − | − | − | − |
| 55 | ± | − | − | − |
| E | + | − | + | + |
| F | + | − | + | + |
| G | + | + | + | + |
| Control | + | + | + | + |

* 1 part active substance per $10^6$ parts rinse bath

C. Inhibition Test

Ten ml of Bacto-Agar (Difco No. B 140) were each poured into Petri dishes. 10 ml of molten agar prepared as stated under A) above and inoculated with *Staphylococcus aureus* SG 511 and *Escherichia coli* were overlaid on each of the Petri dishes containing the Bacto-Agar. Cotton fabric disks treated according to (B) above were, after drying, each laid on a Petri dish, which was then incubated for 24 hours at 37° C. Thereafter, the zone wherein all growth of the bacteria had been inhibited were assessed in millimeters. The results obtained are given in Table 8, wherein + signifies growth under the textile sample
− signifies no growth under the textile sample
± signifies traces of growth under the textile sample Table 8

| Bacterium | Staphylococcus aureus SG 511 | | Escherichia coli | |
| --- | --- | --- | --- | --- |
| Concentration in ppm* | 6,2 | 25 | 6,2 | 25 |
| Compound No. (Table 1) | | | | |
| 3 | 9− | 11− | 6− | 10− |
| 5 | 7− | 15− | 6− | 10− |
| 10 | 11− | 13− | 9− | 10− |
| 46 | 8− | 11− | 3− | 4− |
| 51 | 7− | 10− | 4− | 5− |
| 53 | 8− | 11− | 3− | 5− |
| 55 | 10− | 13− | 5− | 6− |
| E | 0+ | 0− | 0+ | 0+ |
| F | 0+ | 0± | 0+ | 0+ |
| G | 0+ | 0+ | 0+ | 9+ |
| Control | 0+ | 0+ | 0+ | 0+ |

L6 * 1 part active substance per $10^6$ parts rinse bath

The diphenyl-carbamic acid esters of Formula I, produced according to the invention, have a broad and varied range of application for the control of microorganisms, especially of bacteria and fungi, and for the protection of organic materials and objects against attack by microorganisms. Thus, they can be directly worked into the material to be protected, for example into synthetic resin materials such as polyamides and polyvinyl chloride, into baths for the treatment of paper, into thickeners for printing inks, consisting of starch or cellulose derivatives, into lacquers and paints, containing casein for example, into cellulose, into viscose spinning masses, into paper, into animal mucilages or oils, into polyvinyl alcohol based permanent sizing agents, into cosmetic articles, into ointments or powders. In addition they can be added to preparation of inorganic or organic pigments for painters, plasticizers, etc. The new compounds are especially valuable for the protection of textiles of all kinds, e.g., textiles based on cellulose and keratin material, since they are notably substantive to such fiber materials.

In still other application forms, the carbamic acid esters of Formula I can be employed dissolved in organic solvents, for example as so-called "sprays" or as dry cleaners or to impregnate wood, the organic solvent being preferably non-miscible with water, in particular petroleum fractions; but also water-miscible solvents such as lower alcohols, for example methanol or ethanol, or ethylene glycol monomethyl or monoethyl ether are suitable.

In addition, they can be employed together with wetting or dispersing agents in the form of aqueous dispersions, for example for the protection of substances which tend to rot such as for the protection of leather, paper, etc.

Solutions or dispersions of the active substances, which can be employed for the protection of these materials, preferably have a concentration of active substance of at least 0.005 g/liter.

A preferred field of application of the diphenyl carbamic acid esters of Formula I is the disinfection of washed goods and for the protection of washed goods against attack by microorganisms. For this purpose rinse baths are used containing the said carbamic acid esters, advantageously in concentrations of about 5 to 200 parts per million, calculated on the bath.

The bath can, in addition, also contain other usual auxiliaries such as optical brighteners, softeners, acid-reacting salts such as ammonium or zinc silicofluoride or certain organic acids such as oxalic acid, also finishing agents, for example those based on synthetic resins or starch.

Suitable as wash goods which can be disinfected with rinse baths containing the compounds according to the invention are primarily organic fiber materials, namely that of natural origin such as cellulosic material, e.g., cotton; or polypeptide material, e.g., wool or silk; or synthetic fiber material such as that based on polyamide, polyacrylonitrile or polyester; or mixtures of the above fibers.

The carbamic acid esters according to the invention in the concentrations given, impart to the bath as well as to the treated wash goods a broad and long-lasting disinfection against Staphylococcus and Coli forms, which continues even after exposure of the active substance or the goods treated therewith to light. They are distinguished by their high stability to light on the goods treated therewith as well as by their high activity and broad range of action against gram-positive and gram-negative organisms.

The new carbamic acid esters are also very effective against the bacterial flora causing perspiration odor, and for that reason and because of their slight toxicity, they are suitable as deodorants for laundry or as additives for cosmetic agents such as ointments or creams.

Especially valuable is the use of the new carbamic acid esters of Formula I produced according to the invention as active substances for the healing of diseased conditions of the skin, the intestinal system and the urinal track of warm-blooded animals, which is possible due to their excellent action against pathogenic bacteria and fungi, their relatively low toxicity, as well as the fact that they are largely excreted from the body in an unchanged, active form.

The antimicrobial compositions according to the invention contain at least one diphenyl carbamic acid ester of Formula I as active ingredient, together with the usual pharmaceutical carriers. The type of carrier depends to a large extent on the intended use. Ointments, powders and tinctures are especially suitable for external application, for example for the disinfection of healthy skin as well as for the disinfection of wounds and for the treatment of dermatoses and affections of the mucous membranes which are caused by bacteria or fungi. The ointment bases can be anhydrous, e.g., they can consist of mixtures of wool fat and vaseline, or they can consist of aqueous emulsions in which the active substance is suspended. Suitable carriers for powders are, e.g., starches, such as rice starch, the bulk weight of which, if desired, can be made lighter, e.g., by the addition of the highly dispersed silicic acid, or heavier by the addition of talcum. Tinctures contain at least one diphenyl carbamic acid ester of Formula I in aqueous ethanol, in particular 45–75 percent ethanol, to which, if desired, 10–20 percent glycerin may be added. Solutions prepared from the usual solubility promoters such as, e.g., polyethylene glycol, as well as optionally, from emulsifying agents, re used in particular for the disinfection of healthy skin. The content of active ingredient in the above forms for external application is preferably between 0.1 and 5 percent.

Suitable for the disinfection of the mouth and throat are gargles, or concentrates for the preparation thereof, in particular prepared from alcoholic solutions containing about 1–5 percent of active substance to which glycerin and/or flavorings can be added, and also lozenges, i.e., solid dosage units, having a relatively high content of sugar or similar substances and a relatively low content of active substance of about 0.2 – 20 percent, as well as the usual additives such as binding agents and flavorings.

For intestinal disinfection and for the oral treatment of infections of the urinal tract, in particular solid dosage unit forms such as tablets, dragees and capsules are suitable, which preferably contain between 10 percent and 90 percent of a diphenyl carbamic acid ester of Formula I to enable the administration of daily doses of between 0.1 and 2.5 g to adults or of suitably reduced doses to children.

Tablets and dragee cores are produced by combining the carbamic acid esters of Formula I with solid, pulverulent carriers such as lactose, saccharose, sorbitol, maize starch, potato starch or amylopectin, cellulose derivatives or gelatin, preferably with the addition of lubricants such as magnesium or calcium stearate or polyethylene glycols of suitable molecular weight. Dragee cores are then coated, for example, with concentrated sugar solutions which may also contain, e.g., gum arabic, talcum and/or titanium dioxide, or they are coated with a lacquer dissolved in volatile organic solvents or mixture of solvents. Dyestuffs can be added to these coatings, e.g., to differentiate between varying dosages. Perles (pearl-shaped, sealed gelatine capsules) and other closed capsules consist, for example, of a mixture of gelatin and glycerin, and contain, e.g., mixtures of a new carbamic acid ester of Formula I with polyethylene glycol. Hard gelatine capsules contain, for example, granulates of an active substance with solid pulverluent carriers such as, e.g., lactose, saccharose, sorbitol, mannitol; starches such as potato starch, maize starch or amylopectin, cellulose derivatives or gelatin, as well as magnesium stearate or stearic acid.

In all of the forms of administration, whether for technical, cosmetic, hygienic or medical use, the new diphenyl carbamic acid esters of Formula I can be present as sole active ingredient or they can be combined with other known antimicrobial, in particular antibacterial and/or antimycotic substances, for example to broaden the range of application. They can be combined, for example, with halogenated salicylic acid alkyl amides and anilides, with halogenated diphenyl ureas, with halogenated benzoxazoles or benzoxazolones, with polychlorohydroxy-diphenylmethanes, with halogen-dihydroxy-diphenyl sulfides, with bactericidal 2-imino-imidazolidines or tetrahydropyrimidines or with bactericidal quaternary compounds or with certain dithiocarbamic acid derivatives such as tetramethyl-thiuram disulfide. Optionally, carriers having themselves favorable pharmacological properties may also be used, such as sulfur as a powder base, or zinc stearate as a component of ointment bases.

In the following examples, a number of typical forms of application for various uses are described.

EXAMPLE 4

Wound dusting powder: 3.00 g of active substance, 5.0 g of zinc oxide and 41.9 g of rice starch are thoroughly mixed with 50.0 g of talcum which has been impregnated with 0.1 g of perfume. The mixture is passed through a suitable, fine sieve and again well mixed.

EXAMPLE 5

Antiseptic ointment: 3.0 g of active ingredient are triturated with 3.0 g of paraffin oil, and added to a mixture of 10.0 g of wool fat and 84.0 g of white vaseline, which has been melted at a moderate temperature. The mixture is allowed to cool while stirring.

EXAMPLE 6

Lozenges for the disinfection of the mouth and throat: 50.0 g of active substance are carefully mixed with 400.0 g of powdered sugar and the mixture is evenly moistened with a granulating solution of 8.0 g of gelatine and 2.0 g of glycerin in about 120 g of water. The mass is granulated through a suitable sieve and dried. A sieved mixture of 3.0 g of highly dispersed silicic acid, 4.0 g of magnesium stearate, 0.7 g of flavoring and 42.3 g of talcum is added to the dry granulate and thoroughly mixed. The mixture is pressed into 1000 tablets.

EXAMPLE 7

Gargle concentrate: 5.0 g of active substance are dissolved in 60.0 g of 96 percent ethanol, 15.0 g of glycerin and 0.3 g of flavoring are added and the solution is made up to 100.0 g with 19.7 g of distilled water. For gargling, about 5 – 20 drops of this concentrate are used in water.

EXAMPLE 8

Tablets for the disinfection of the intestines and the urinal tract: To prepare 1000 tablets each containing 150 mg of active substance, first 150.0 g of active substance are thoroughly mixed with 60.0 g of maize starch and 35.0 g of lactose, and the mixture is evenly moistened with a granulating solution prepared from 5.0 g of gelatin and 3.0 g of glycerin in about 70 g of water. The mass is granulated through a suitable sieve and dried. The granulate is thoroughly mixed with a sieved mixture of 15.0 g of talcum, 10.0 g of dried maize starch and 2.0 g of magnesium stearate. The mixture is pressed into 1000 tablets.

EXAMPLE 9

Dragees for the disinfection of the intestines and the urinal tract: To prepare 1000 dragee cores, first 150.0 g of active substance are thoroughly mixed with 60.0 g of maize starch and 34.0 g of lactose. This mixture is mixed with a binding agent consisting of 6.0 g of starch, 3.0 g of glycerin and about 54 g of distilled water, and the mass obtained is granulated through a suitable sieve and dried. The granulate is thoroughly mixed with a sieved mixture of 15.0 g of talcum, 10.0 g of maize starch and 2.0 g of magnesium stearate, and the mixture is pressed into 1000 dragee cores each weighing 280 mg.

The above cores are coated in a coating pan with a layer consisting of: 2.000 g of shellac, 7.500 g of gum arabic, 0.180 g of dyestuff, 2.000 g of highly dispersed silicic acid, 35.00 g of talcum and 58.320 g of sugar. 1000 dragees are obtained each weighing 385 mg and containing 150 mg of active substance.

We claim:
1. An O,N-diphenyl-carbamic acid ester of the formula

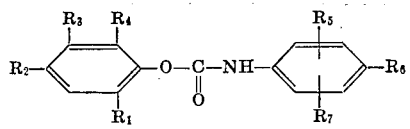

wherein
$R_1$ represents phenoxy substituted by from one to three identical or different halogen atoms selected from the group consisting of fluorine, chlorine and bromine, one of $R_2$, $R_3$ and $R_4$ represents chlorine or bromine, and each of the others of $R_2$, $R_3$ and $R_4$ represents hydrogen, chlorine or bromine, each of $R_5$ and $R_7$ represents hydrogen, fluorine, chlorine, bromine, lower alkyl, lower alkoxy, halogeno-lower alkyl, nitro or hydroxy, and $R_6$ represents hydrogen, fluorine, chlorine, bromine, lower alkyl, lower alkoxy, di-lower alkylamino or hydroxy.

2. N-(3,4-dichlorophenyl)-carbamic acid-0-[2-(2',4'-di-chlorophenoxy)-5-chlorophenyl]-ester.

3. N-(3,5-dimethylphenyl)-carbamic acid-0-[2-(2',4'-dichlorophenoxy)-5-chlorophenyl]-ester.

4. N-(4-methylphenyl)-carbamic acid-0-[2-(4'-chlorophenoxy)-4-bromo-5-chlorophenyl]-ester.

5. N-(3,4-dichlorophenyl)-carbamic acid-0-[2-(2',4'-di-chlorophenoxy)-5-chlorophenyl]-ester.

6. N-(3-nitro-4-chlorophenyl)-carbamic acid-0-[2-(2',4<Y-dichlorophenoxy)-5-chlorophenyl]-ester.

7. N-(3-trifluoromethylphenyl)-carbamic acid-0-[2-(2',4'-dichlorophenoxy)-5-chlorophenyl]-ester.

8. N-(4-hydroxyphenyl)-carbamic acid-0-[2-(2',4'-dichlorophenoxy)-5-chlorophenyl]-ester.

9. N-(2-methylphenyl)-carbamic acid-0-[2-(2',4'-dichlorophenoxy)-4-bromo-5-chlorophenyl]-ester.

* * * * *